US009578951B1

(12) United States Patent
Wagner

(10) Patent No.: US 9,578,951 B1
(45) Date of Patent: Feb. 28, 2017

(54) OUTDOOR CAMPING EQUIPMENT HANGING SYSTEM

(71) Applicant: Zachary Wagner, Fort Harrison, MT (US)

(72) Inventor: Zachary Wagner, Fort Harrison, MT (US)

( * ) Notice: Subject to any disclaimer, the term of this patent is extended or adjusted under 35 U.S.C. 154(b) by 0 days.

(21) Appl. No.: 14/273,244

(22) Filed: May 8, 2014

(51) Int. Cl.
*A47G 29/00* (2006.01)
*A45F 3/00* (2006.01)

(52) U.S. Cl.
CPC .......... *A45F 3/00* (2013.01); *A45F 2003/001* (2013.01)

(58) Field of Classification Search
USPC .......... 135/90; 248/692, 693, 492, 320, 322, 248/328; 254/391, 394
See application file for complete search history.

(56) References Cited

U.S. PATENT DOCUMENTS

| 4,793,646 | A | * | 12/1988 | Michaud, Jr. | ........... B63B 21/54 114/221 R |
| 5,553,905 | A | * | 9/1996 | Bentivegna | ................ B25J 1/04 294/175 |
| 5,950,981 | A | * | 9/1999 | Judy | .......................... A45F 3/00 248/100 |
| 6,056,274 | A | * | 5/2000 | Naas | ........................ B66D 3/04 248/317 |
| 6,353,946 | B1 | * | 3/2002 | Steiner | ...................... A45B 3/00 5/120 |
| 6,450,557 | B1 | * | 9/2002 | Martinez | .................. A47F 13/08 294/210 |
| 6,652,013 | B1 | * | 11/2003 | Peterson | ................... B25G 1/04 294/210 |
| 7,367,548 | B2 | * | 5/2008 | Rosenfeldt | ............... B66D 1/04 211/117 |
| 7,380,771 | B1 | | 6/2008 | Joy et al. | |
| 7,429,067 | B1 | * | 9/2008 | Rosa | ....................... F21S 4/001 248/303 |
| 8,752,877 | B2 | * | 6/2014 | Spindler | ............. F21V 21/0808 294/209 |
| 9,061,416 | B2 | * | 6/2015 | Shelton | ................... A01G 25/09 |
| 2005/0284702 | A1 | * | 12/2005 | Deslaurier | ................ B25B 9/00 182/187 |

* cited by examiner

*Primary Examiner* — Bradley Duckworth
(74) *Attorney, Agent, or Firm* — Morrison & Foerster LLP

(57) ABSTRACT

An equipment hanging system mountable with a pole includes a first mountable component, a second mountable component, a pole adapter, and a cord. The first mountable component includes a first mounting portion, a first adapter interface, and a cord-attachment portion. The second mountable component includes a second mounting portion, a second adapter interface, and a cord-guide portion. The pole adapter includes a mountable component interface releasably engageable to the adapter interfaces of the mountable components, a pole interface securely attachable to the pole, and a demounting hook releasably engageable to the mounting portions of the mounting components. The cord includes a first end attached to the cord-attachment portion and a second end extending through the cord-guide portion. The equipment hanging system may also include an equipment bag and an equipment fastener to connect the equipment bag to the cord between the mountable components.

19 Claims, 4 Drawing Sheets

OUTDOOR CAMPING EQUIPMENT HANGING SYSTEM

BACKGROUND

1. Field

This application relates generally to a system for hanging equipment outdoors, and, more specifically, to a system including mounting hardware and a pole adapter to suspend camping equipment on an elevated cord.

2. Description of the Related Art

Many people visit wilderness areas to hunt, fish, hike, camp, or engage in other outdoor activities. A common issue faced by people visiting the wilderness is the risk that they will encounter wild animals. Animals, and bears in particular, may be attracted by the smell of equipment or supplies, such as food and toiletries, or waste being carried by the visitor. Visitors therefore take measures to store their belongings that may attract wild animals in animal-resistant containers or to hang their belongings out of an animal's reach away from their campsite.

Bear-resistant containers, however, not only add to the amount of equipment a person must carry but also are typically bulky and heavy, making them difficult to transport over wilderness terrain.

Furthermore, hanging one's equipment is often a time-consuming, tedious, and frustrating process. One common technique involves suspending a rope between the branches of two separate trees. One end of the rope may be secured to the base of a tree while the loose end is thrown over a branch of the tree. While ensuring that the rope remains draped over the branch, the loose end is thrown over a branch of another tree. The person's equipment is attached to the rope between the two trees and is lifted off the ground by pulling on the loose end of the rope. Finally, the loose end is tied to the second tree or anchored to some other fixed object.

Although relatively simple in theory, the method described above can prove to be quite challenging. As an initial threshold, one must possess some amount of throwing ability to get the rope draped over the branch. Also, one must find two branches spaced apart from each other that are high enough to keep the equipment out of an animal's reach. Moreover, both branches must be sturdy enough to support the weight of the equipment to be hung and must also be relatively clear of other branches, twigs, leaves, or debris that may be in the way of the rope being thrown over the desired branch.

Thus, there remains an opportunity to provide an improved system and method for hanging equipment in the wilderness.

SUMMARY

The system and method described below provides an improved way of hanging equipment, supplies, or the like, in the wilderness.

In one embodiment, an equipment hanging system mountable with a pole includes a first mountable component, a second mountable component, a pole adapter, and a cord. The first mountable component includes a first mounting portion, a first adapter interface, and a cord-attachment portion. The second mountable component includes a second mounting portion, a second adapter interface, and a cord-guide portion. The pole adapter includes a mountable component interface releasably engageable to the adapter interfaces of the mountable components, a pole interface securely attachable to the pole, and a demounting hook releasably engageable to the mounting portions of the mounting components. The cord includes a first end attached to the cord-attachment portion of the first mountable component and a second end extending through the cord-guide portion of the second mountable component. The equipment hanging system may also include an equipment bag or other container and an equipment fastener to connect the equipment bag or other container to the cord between the mountable components.

In one embodiment, the mounting portions include a curved hook. In another embodiment, the adapter interfaces include an elongated shaft and the mountable component interface includes a hole having a cross-section that matches a cross-section of the elongated shaft. In yet another embodiment, the adapter interfaces include a hole and the mountable component interface includes an elongated shaft having a cross-section that matches a cross-section of the hole.

In one embodiment, the pole interface includes a hole having a resilient deformable material forming a tapered inner surface. In another embodiment, the mountable components are formed from a single rod comprising metal or plastic. In one embodiment, the cord-attachment portion and the cord-guide portion of the second mountable component each include a loop.

In another embodiment, a method of hanging camping equipment includes attaching a pole adapter to a distal end of a pole, engaging a first mountable component with the pole adapter, attaching the first mountable component to an elevated portion of a first tree, engaging a second mountable component with the pole adapter, attaching the second mountable component to an elevated portion of a second tree, attaching the camping equipment to a cord having a first end connected to the first mountable component and a second end passing through a cord-guide portion of the second mountable component, and raising the camping equipment by pulling the second end of the cord to reduce the amount of cord between the first mountable component and the second mountable component.

The method may also include lowering the camping equipment by loosening the second end of the cord to increase the amount of cord between the first mountable component and the second mountable component.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description sets forth specific configurations, parameters, and the like. It should be recognized, however, that such description is not intended as limiting the present disclosure, but is instead provided as a description of exemplary embodiments.

The present disclosure provides an improved equipment hanging system including mountable components, such as hooks, and a complementary pole adapter that may be attached to the end of a common tent pole to position the mountable components in, for example, a tree. The pole adapter includes an interface that is complementary with a portion of each mounting component such that the pole adapter is releasably engageable with the mountable components. The pole adapter also includes an interface configured to fasten the adapter to a commonly sized camping tent pole. Instead of throwing a rope over a tree branch, as discussed above, the rope may be supported by the mountable components, which may be placed on suitable branches using the adapter attached to the end of a pole. The mountable components may be lifted with the pole while the adapter is engaged with the mountable component. The adapter keeps the engaged mountable component relatively stationary relative to the pole while being attached to a branch. The system thus provides an easier method for positioning a cord between elevated branches that is also more accurate, precise, and reliable.

In addition, the pole adapter may be configured to accommodate poles having various size diameters, eliminating the need for the user to carry an additional pole exclusively for the purpose of hanging the mountable components. Instead, users may use a pole from their own tent or some other equipment. By being configured to adapt to poles of various sizes, the adapter allows users to position the mountable component regardless of the size of the particular equipment they may have, provided the pole is long enough to properly place the mountable component. The pole adapter therefore reduces the amount of equipment the user must carry.

Figure 1:
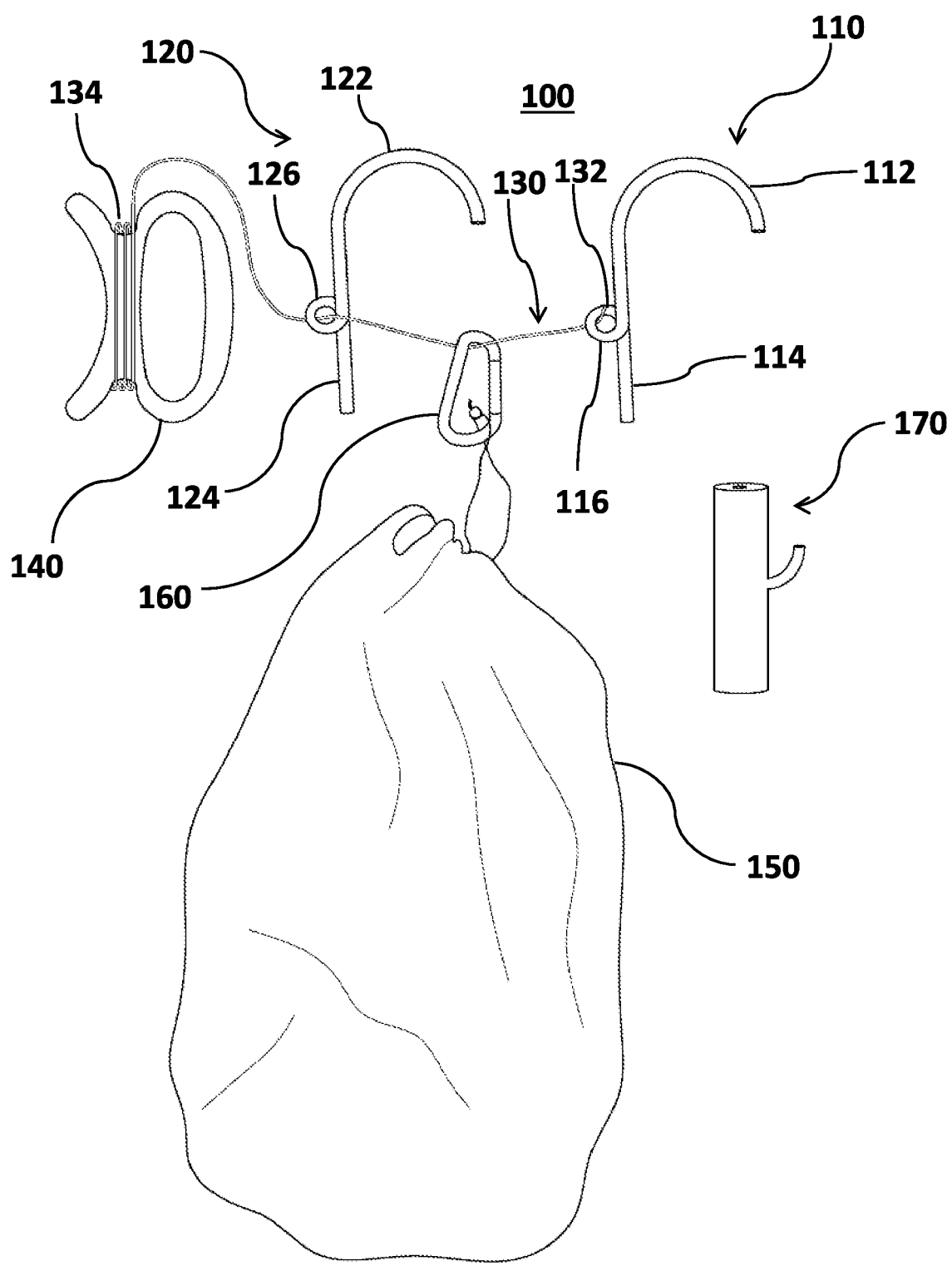
FIG. 1 depicts an exemplary embodiment of an equipment hanging system.

FIG. 1 depicts an exemplary embodiment of an equipment hanging system 100. The system 100 includes two mountable components 110, 120, a cord 130, a cord winder 140, an equipment bag 150, a bag fastener 160, and a pole adapter 170.

In the embodiment shown in FIG. 1, the first mountable component 110 includes a single rod that has been bent into the illustrated shape. The rod may be, for example, a ¼ inch diameter cylindrical rod or tube comprised of a hard rubber or plastic material, or a metal such as aluminum, steel, or the like. Forming the first mountable component 110 from a single piece of material may simplify manufacturing and reduce potential points of failure.

The first mountable component 110 includes a mounting portion 112, a cord-attachment portion 116, and an adapter interface 114. The mounting portion 112 may include a curved hook portion as shown in FIG. 1 that is large enough to attach the first mountable component 110 to the branch of a tree. The adapter interface 114 includes a straight, elongated shaft opposite to and extending away from the mounting portion 112. As discussed in greater detail below, the adapter interface 114 is configured to releasably engage the complementary pole adapter 170 that connects the first mountable component 110 to a pole.

The cord-attachment portion 116 may include a loop between the mounting portion 112 and the adapter interface 114. As shown in FIG. 1, the loop may include a portion that curls around approximately 360 degrees to form a ring and is directed away from the direction in which the hook portion 112 is curved.

The second mountable component 120 includes a mounting portion 122, a cord-guide portion 126, and an adapter interface 124. In the embodiment shown in FIG. 1, the second mountable component 120 is identical to the first mountable component 110. Notably, the loop portion of the second mountable component 120 serves as the cord-guide portion 126, while the loop portion of the first mountable component 110 serves as the cord-attachment portion 116.

The cord 130 may have an end 132 fixedly attached to the cord-attachment portion 116 of the first mountable component 110. The cord 130 may include a cable, wire, rope, string, line, lace, or the like. The cord 130 may be formed, at least in part, from, for example, nylon, metal, cloth, plastic, thread, yarn, or some combination thereof. As discussed above, the cord-attachment portion 116 shown in FIG. 1 includes a loop that provides support for the cord 130 so that the cord 130 does not slip off of the first mountable component 110.

As shown in FIG. 1, the cord 130 passes through the cord-guide portion 126 of the second mountable component 120. The loop in the cord-guide portion 126 provides a smooth interface/aperture for the cord 130 to pass freely through so that a user may adjust the amount of cord 130 between the two mountable components 110, 120. The loop may therefore eliminate the need for additional elements for guiding the cord, such as pulleys, which can add significant weight to the overall system that must be carried by a user.

As shown in FIG. 1, the loose end of the cord 130 that passes through the cord-guide portion 126 may be attached to or wound around the cord winder 140 to retract unused slack in the cord 130. It should be recognized that various types of winders, reels, or the like may be used to secure the loose end of the cord or collect unused slack.

For commonality reasons, the cord-attachment portion 116 of the first mountable component 110 and the cord-guide portion 126 of the second mountable component 120 may both be the same (e.g., a loop), as described above. Alternatively, the cord-attachment portion 116 and the cord-guide portion 126 may have different configurations or shapes. The cord-attachment portion 116 may include an additional or alternative means for allowing rope to be secured to the mountable component 110 without slipping off. For example, the cord-attachment portion 116 may include a groove or one or more short pegs that stick out perpendicularly from the mountable component to keep the cord 130 confined to the cord-attachment portion 116 of the mountable component 110. Furthermore, instead of an integrated loop, the cord-guide portion 126 may include, for example, a ring attached to the second mounting component 120 or a hole through the rod shown in FIG. 1.

Figure 2:
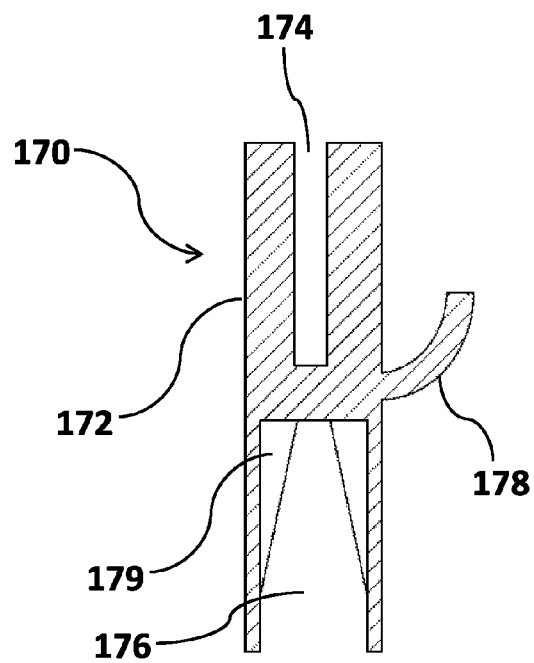
FIG. 2 depicts a cross-section of an exemplary embodiment of a pole adapter.

Turning to FIG. 2, the pole adapter 170 is discussed in greater detail. FIG. 2 depicts a cross-section of the pole adapter 170. As shown, the pole adapter 170 includes a shell 172, a mountable component interface 174, a pole interface 176, and an adapter hook 178.

The shell 172 may be formed from, for example, plastic or metal.

The mountable component interface 174 may be configured to releasably engage a portion of the mountable components 110, 120. The mountable component interface 174 may include a cylindrical hole with a diameter slightly larger than the diameter of the elongated shafts of adapter interfaces 114, 124 of the mountable components 110, 120 so that the shafts fit snuggly in the hole. The hole is preferably deep enough for a substantial portion of the shaft to enter the hole so that the mountable component remains aligned with the axis of the pole adapter 170 while engaged.

Figure 9:
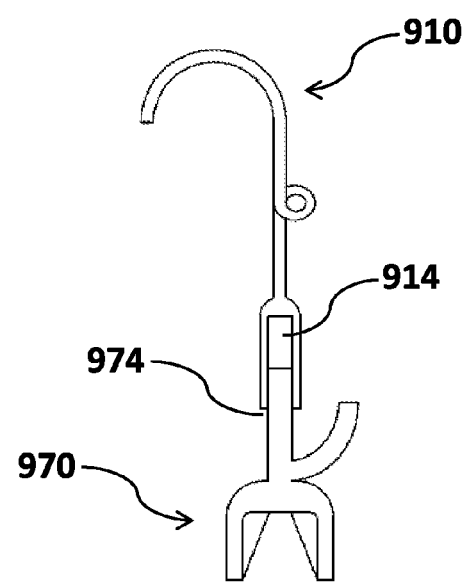
FIG. 9 depicts an alternative embodiment of a mountable component and a pole adapter.

Although the adapter interfaces 114, 124 and the mountable component interface 174 are described above as shafts and a hole, respectively, it should be understood that various alternative complementary interfaces are possible for the mountable components 110, 120 to releasably engage the pole adapter 170. For example, FIG. 9 depicts one embodiment of a mountable component 910 and pole adapter 970 in which the adapter interface 914 of the mountable component 910 includes a hole, and the mountable component interface 974 of the pole adapter 970 includes a shaft configured to engage the hole.

Referring again to FIG. 2, the pole adapter 170 includes a pole interface 176 configured to securely engage tent poles of various sizes. For example, the pole interface 176 may include a hole large enough to engage poles having a diameter between ¼ inch and ½ inch wide. The inside of the hole may include a resilient deformable material 179 comprising, for example, rubber or soft plastic. The inside surface formed by the deformable material 179 may be tapered such that when a pole is pressed into the hole, the deformable material 179 conforms to the size and shape of the pole. Due to its resiliency, the deformable material 179 applies pressure to the outer surface of the pole, which holds the pole firmly in place and may keep the pole adapter 170 substantially fixed relative to the pole.

The adapter hook 178 of the pole adapter 170 extends away from an outer side surface of the adapter 170 and extends upward away from the pole interface 176. The adapter hook 178 may extend far enough away from the side of the pole adapter 170 to allow the mounting portion 112, 122 (e.g., the hook) of the mountable components 110, 120 to easily fit between the adapter hook 178 and the side of the adapter 170. The adapter hook 178 may be a separate piece attached to the adapter 170 or, alternatively, may be integrally formed as part of the adapter 170.

Figure 3:
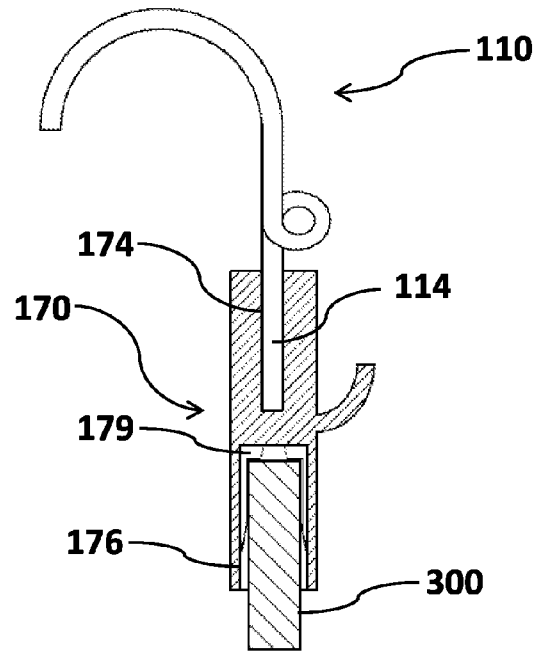
FIG. 3 depicts an example of a pole adapter engaged with a mountable component and a pole.

Turning to FIG. 3, an exemplary embodiment of the pole adapter 170 engaged with the first mountable component 110 and a tent pole 300 is described. As seen in FIG. 3, the shaft portion 114 of the first mountable component 110 is located within the hole of the mountable component interface 174 of the adapter 170, and one end of a tent pole 300 is located within the hole of the pole interface 176. The pole 300 is inserted to the point at which the diameter of the inner surface of the hole matches the diameter of the pole 300. At this point, the pole 300 may be pushed farther into the pole interface 176, causing the deformable material 179 to deform around and firmly grip the outside of the pole 300. By firmly securing the pole 300 to the pole adapter 170, the pole 300 may be used to accurately manipulate and position the mountable component 110.

As shown in FIG. 3, the shaft of the adapter interface 114 and the end of pole 300 enter opposite ends of the pole adapter 170. To prevent the pole 300 and the shaft of the adapter interface 114 from interfering with one another, the pole adapter 170 may include a barrier between the hole of the mountable component interface 174 and the hole of the pole interface 176.

Figure 4:
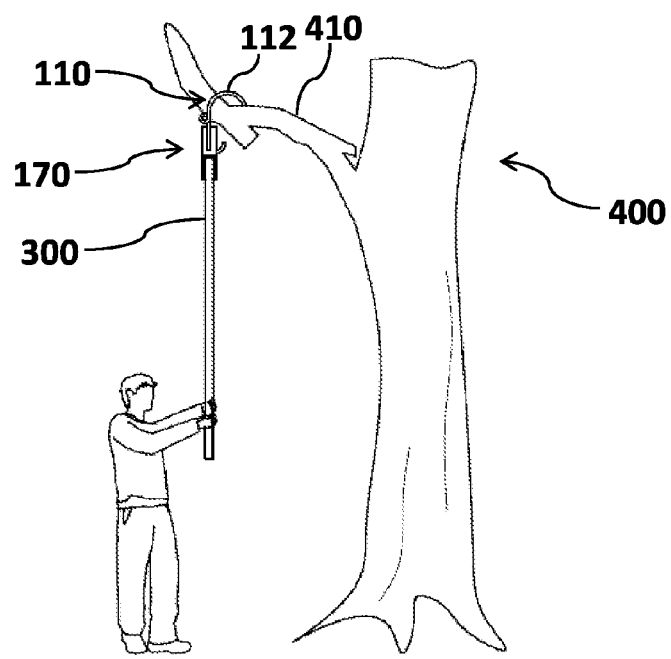
FIG. 4 depicts a user attaching a mountable component to a tree using the pole adapter.

Turning to FIG. 4, an example of how a user may attach the mountable components 110, 120 to a branch 410 of a tree 400 using the pole adapter 170 is described. As shown, the mountable component 110 is attached to the end of the user's pole 300 via the pole adapter 170. The pole adapter 170 allows the user to precisely and accurately position the mountable component 110 with the pole 300 onto the branch 410. As seen in FIG. 4, the user lifts the mountable component 110 overhead with the pole 300 and attaches the hook-shaped mounting portion 112 of the mountable component 110 to the branch 410 of the tree 400.

Once the mountable component 110 is attached to the branch 410, the user may lower the pole 300 to disengage the pole adapter 170 from the mountable component 110 (e.g., remove the shaft portion of the adapter interface 114 from the hole of the mountable component interface 174). Preferably, the pole adapter 170 attaches more tightly to the pole 300 than to the mountable component 110, 120 so that when the user lowers the pole 300 the adapter 170 does not remain attached to the mountable component 110, leaving the adapter 170 up in the tree 400. For example, the hole in the mountable component interface 174 of the pole adapter 170 may be large and smooth enough for the shaft of the adapter interface 114 to slide in and out of the hole with little resistance. Also, in addition to the means described above, the adapter 170 may include additional and/or alternative means for securely engaging the pole 300. For example, the pole interface 176 may include one or more fasteners capable of securing the adapter 170 to the pole such as, for example, clamps, screws, pins, clips, straps, ties, or the like. In one embodiment, the pole adapter 170 remains snuggly attached to the pole 300 when disengaged from the mountable component 110, leaving the mountable component 110 attached to the tree branch 410 and the pole adapter 170 firmly attached to the pole 300.

However, when the adapter interface 114 (e.g., the shaft portion) of the mountable component 110, 120 is configured to easily disengage from the pole adapter 170, the mountable component 110 may have a tendency to rotate or shift relative to the pole 300. Accordingly, the adapter interface 114 of the mountable component 110 and the mountable component interface 174 of the adapter 170 may be configured to keep the mountable component 110 substantially fixed and aligned with the pole 300. In some embodiments, the mountable component interface 174 of the pole adapter 170 and the adapter interface 114, 124 of the mountable component 110, 120 may be complementarily shaped to prevent the mountable components 110, 120 from rotating or shifting relative to the pole 300. For example, the adapter interfaces 114, 124 (e.g., the shaft portions) and the mountable component interface 174 (e.g., the corresponding hole in the pole adapter 170) may have rectangular cross-sections, or the adapter interfaces 114, 124 may have a shaft portion with a tab that aligns with a slot in a hole of the mountable component interface 174 to fix the orientation of the mountable component 110 relative to the adapter 170.

Although not shown in FIG. 4, it should be recognized that a user may also use the pole adapter 170 and pole 300 to attach the second mountable component 120 to another branch in a nearby tree. Once the mountable components 110, 120 are mounted, the amount of cord 130 between the mountable components 110, 120 may be increased to allow the cord 130 to drop down to the ground or at least to a point where the user may attach equipment to the cord 130.

Figure 5:
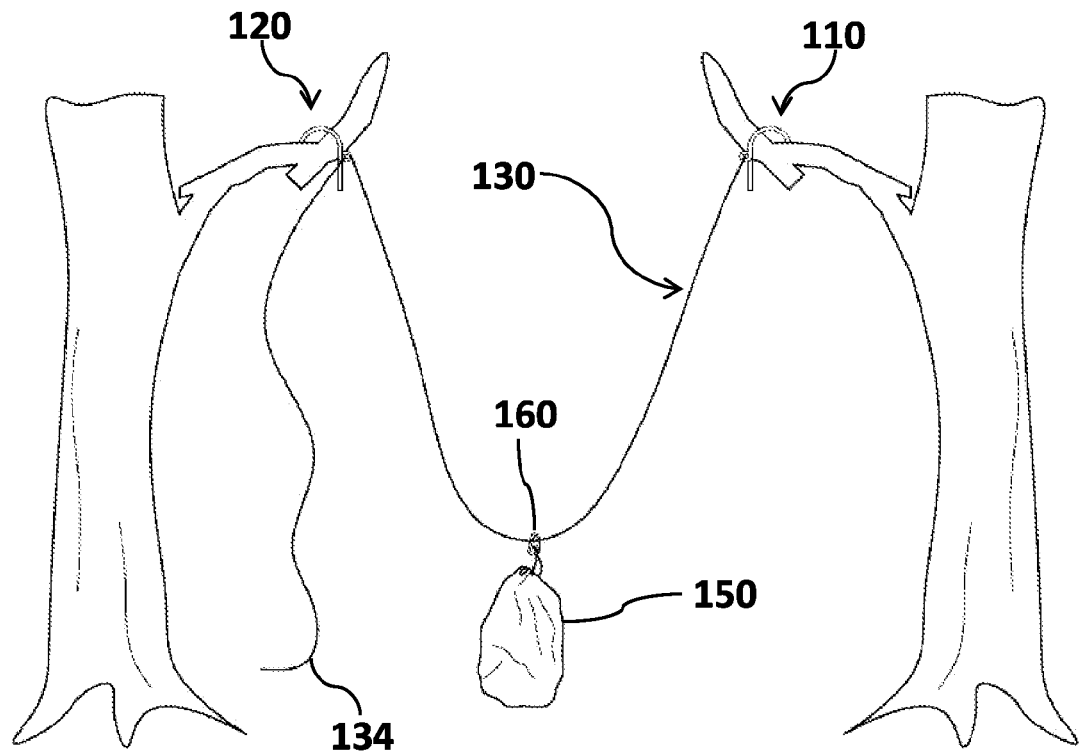
FIG. 5 depicts an embodiment of the equipment hanging system mounted on two trees prior to elevating an equipment bag.

FIG. 5 depicts the cord 130 and mountable components 110, 120 positioned in a pair of trees prior to suspending equipment in bag 150. As mentioned above, a bag fastener 160 may be used to attach the bag 150 to the portion of the cord 130 between the two mountable components 110, 120. The bag fastener 160 may include, for example, a carabiner commonly used in mountain climbing, a metal ring, a rope tied in a loop, or the like. In addition, the bag fastener 160 may be attached to the cord 130 prior to positioning one or both of the mountable components 110, 120. By attaching the bag fastener 160 before both mountable components are positioned, the bag fastener 160 may provide a weight to help pull the cord 130 down to the level of the user.

Although the description above refers to a bag 150, it should be recognized that other containers or equipment may be connected to the cord 130 including, for example, a cooler, chest, backpack, or the like. Also, although the description above refers to a bag fastener 160, it should be recognized that an appropriate type of fastener may be used based on the type of containers or equipment being attached to the cord.

Figure 6:
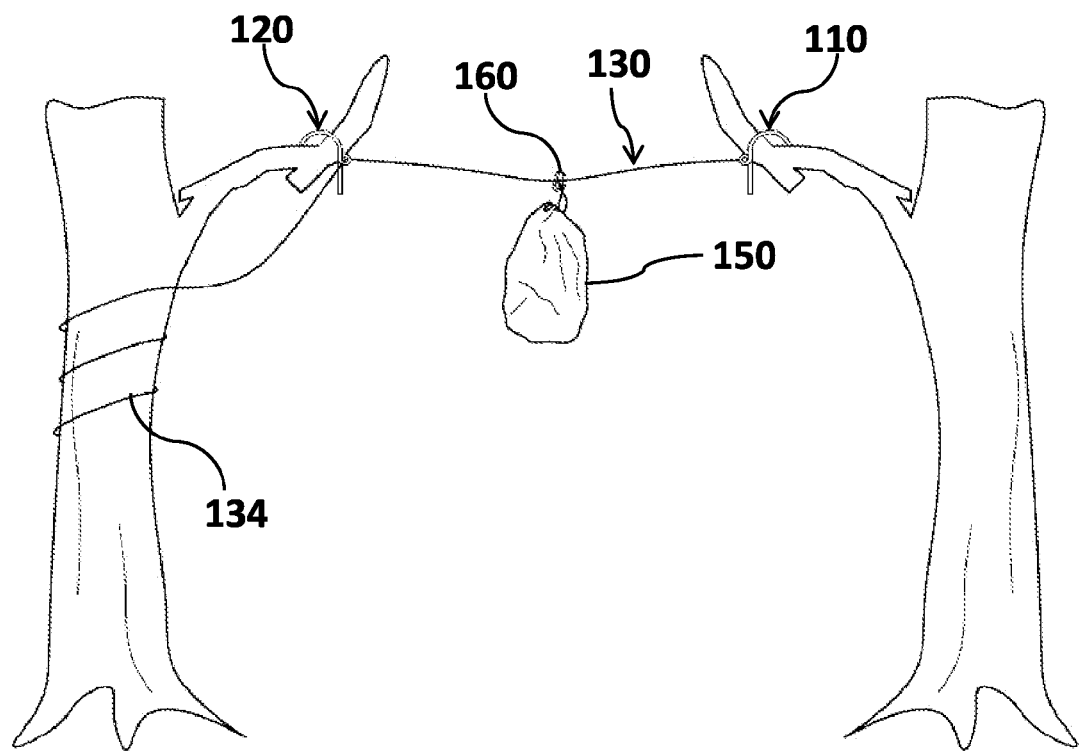
FIG. 6 depicts an embodiment of the equipment hanging system suspending an equipment bag between two trees.

Turning now to FIG. 6, once the supply bag 150 is attached to the fastener 160 and the fastener 160 is attached to the cord 130, the free end of the cord 134 may be pulled to reduce the amount of cord 130 between the two mountable components 110, 120 and hoist the equipment into the air. The fastener 160 allows the equipment to slide along the cord 130 as it is lifted, therefore keeping the equipment approximately centered between the two mountable components 110, 120. Once the equipment is at the desired height, the free end of the cord 134 (which may be attached to or wound around the winder 140) may be secured to prevent the equipment from drooping or falling. For example, the cord 130 may be wrapped around a tree several times and tied, or secured to some other stationary object. Conversely, to lower the equipment, the free end of the cord 134 is detached from the object to which it was secured, and the cord 130 is loosened to lower the equipment to the ground.

Figure 7:
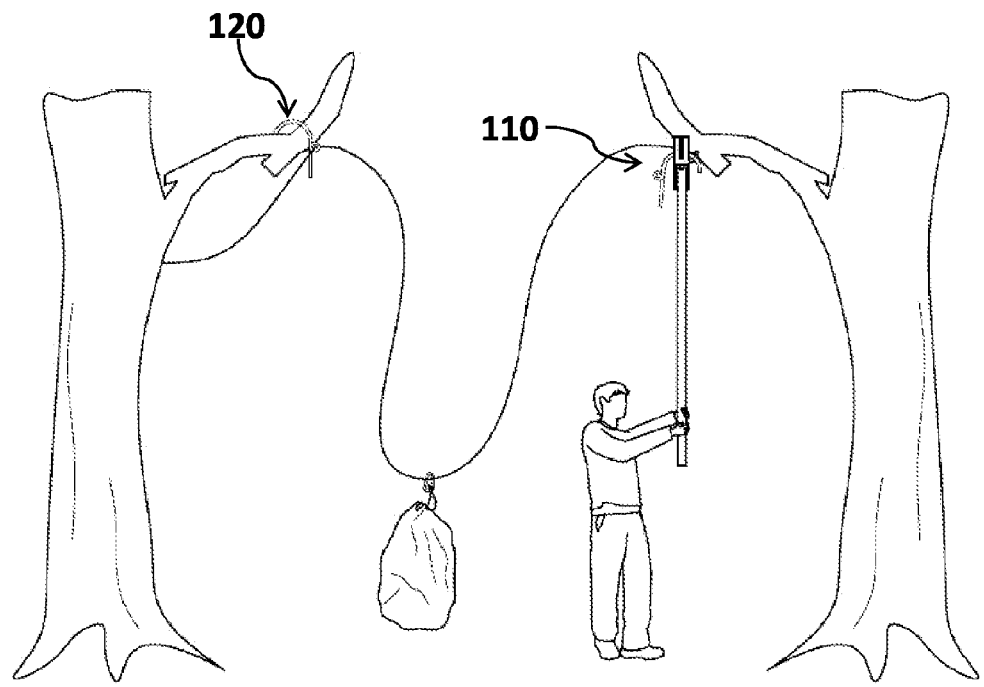
FIG. 7 depicts a user detaching a mountable component from a tree using the pole adapter.
Figure 8:
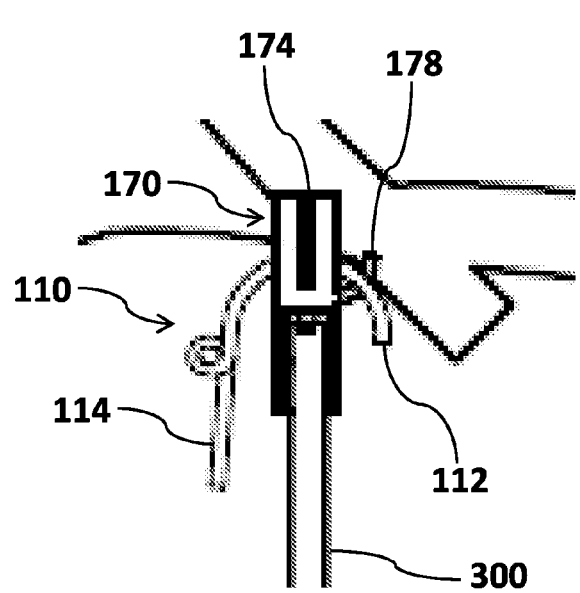
FIG. 8 depicts an enlarged view of the mountable component being detached from the tree using the pole adapter.

Turning to FIG. 7, a user may also use the pole adapter 170 to remove or detach the mountable components 110, 120 from the branches of the trees. To remove the mountable components 110, 120, the pole adapter 170 is again attached to the tip of the pole 300. As depicted in the enlarged view shown in FIG. 8, the user may use the adapter hook 178 included on the pole adapter 170 to engage the mountable component 110 and lift it off of the tree limb. As described above, the adapter hook 178 may be configured to easily catch onto a portion of the mountable components 110, 120, such as the hook-shaped part of the mounting portion 112, 122 as shown in FIG. 8. When the adapter hook 178 is configured to easily engage the mountable components 110, 120, the pole adapter 170 may not provide the same stability and control as when the adapter interface 114 is engaged with the mountable component interface 174. However, the same precision is not required to remove the mountable components 110, 120 as it is to initially position them. During removal from a branch, it is more critical that the user be able to easily engage the mountable components 110, 120 since they are potentially located several feet above the user's head. Thus, the pole adapter 170 provides a mountable component interface 174 that may be difficult to engage from a distance but that allows for precise control of the mountable components for attaching to a tree branch (as seen for example in FIG. 4) while also providing another means (e.g., a hook) that can easily engage the mountable components 110, 120 at a great distance from the user when precise control is not required (e.g., when demounting the mountable components 110, 120 from a tree, as seen in FIGS. 7-8).

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

I claim:

1. An equipment hanging system mountable with a pole, the system comprising:
    a first mountable component having a first mounting portion, a first adapter interface, and a cord-attachment portion;
    a second mountable component having a second mounting portion, a second adapter interface, and a cord-guide portion;
    a pole adapter comprising:
        a mountable component interface releasably engageable to the first adapter interface of the first mountable component and the second adapter interface of the second mountable component;
        a pole interface securely attachable to the pole, wherein the pole interface is configured to accommodate poles having various size diameters; and
        a demounting hook releasably engageable to the first mounting portion and the second mounting portion; and
    a cord having a first end attached to the cord-attachment portion of the first mountable component and a second end extending through the cord-guide portion of the second mountable component.

2. The system of claim 1, wherein the cord-attachment portion is between the first mounting portion and the first adapter interface, and wherein the cord-guide portion is between the second mounting portion and the second adapter interface.

3. The system of claim 1, wherein the first mounting portion and the second mounting portion each include a curved hook.

4. The system of claim 1, wherein the first adapter interface includes a first elongated shaft and the second adapter interface includes a second elongated shaft.

5. The system of claim 4, wherein the mountable component interface includes a hole having a cross-section that matches a cross-section of the first elongated shaft and a cross-section of the second elongated shaft.

6. The system of claim 1, wherein the first adapter interface includes a first hole and the second adapter interface includes a second hole.

7. The system of claim 6, wherein the mountable component interface includes an elongated shaft having a cross-section that matches a cross-section of the first hole and a cross-section of the second hole.

8. The system of claim 1, wherein the pole interface of the pole adapter is configured to attach the mounting attachment to poles having diameters between approximately ¼ inch and approximately ½ inch.

9. The system of claim 1, wherein the pole interface includes a hole having a resilient deformable material forming a tapered inner surface configured to, when the pole is inserted into the hole, conform to a size and shape of an outer surface of the pole and apply pressure to the outer surface of the pole.

10. The system of claim 1, wherein the first mountable component and the second mountable component each are formed from a single rod comprising metal or plastic.

11. The system of claim 1, wherein the cord-attachment portion of the first mountable component and the cord-guide portion of the second mountable component each include a loop.

12. The system of claim 1, wherein the demounting hook is attached to a side of the pole adapter.

13. The system of claim 1, further comprising:
at least one equipment ring attachable to the cord between the first mountable component and the second mountable component; and
a cord winder attachable to the second end of the cord for wrapping the cord.

14. A method of hanging camping equipment, the method comprising:
attaching a pole adapter to a distal end of a pole, wherein the pole adapter is attached to the pole at a pole interface that is configured to accommodate poles having various size diameters;
engaging a first adapter interface of a first mountable component with a mountable component interface of the pole adapter;
attaching a first mounting portion of the first mountable component to an elevated portion of a first tree;
engaging a second adapter interface of a second mountable component with the mountable component interface of the pole adapter;
attaching a second mounting portion of the second mountable component to an elevated portion of a second tree;
attaching the camping equipment to a cord having a first end connected to a cord-attachment portion of the first mountable component and a second end passing through a cord-guide portion of the second mountable component;
raising the camping equipment by pulling the second end of the cord to reduce the amount of cord between the first mountable component and the second mountable component;
detaching the first mountable component from the first tree by engaging the first mounting portion of the first mountable component with a hook portion of the pole adapter; and
detaching the second mountable component from the second tree by engaging the second mounting portion of the second mountable component with the hook portion of the pole adapter.

15. The method of claim 14, further comprising:
lowering the camping equipment by loosening the second end of the cord to increase the amount of cord between the first mountable component and the second mountable component.

16. The method of claim 14, wherein attaching the pole adapter to the distal end of the pole includes inserting the distal end of the pole into a hole of the pole adapter, the hole having a resilient deformable material forming a tapered inner surface that is deformed as the distal end of the pole is inserted into the hole.

17. The method of claim 14,
wherein engaging the first adapter interface of the first mountable component with the mountable component interface of the pole adapter includes inserting an elongated shaft of the first mountable component into a complementary hole of the pole adapter, and
wherein engaging the second adapter interface of the second mountable component with the mountable component interface of the pole adapter includes inserting an elongated shaft of the second mountable component into the complementary hole of the pole adapter.

18. An equipment hanging system mountable with a pole, the system comprising:
a first mountable component having a first hook portion, a first elongated shaft, and a first loop portion between the first hook portion and the first elongated shaft;
a second mountable component having a second hook portion, a second elongated shaft, and a second loop portion between the second hook portion and the second elongated shaft;
a pole adapter comprising:
a first hole releasably engageable with the first elongated shaft and the second elongated shaft;
a second hole having a resilient deformable material forming a tapered inner surface configured to securely attach the pole to the pole adapter, wherein the second hole and resilient deformable material are configured to accommodate poles having various size diameters; and
a demounting hook releasably engageable with the first hook portion and the second hook portion; and
a cord having a first end attached to the first loop portion of the first mountable component and a second end extending through the second loop portion of the second mountable component.

19. The system of claim 18, wherein the first mountable component and the second mountable component each are formed from a single rod comprising metal or plastic.

* * * * *